United States Patent

[11] 3,540,481

| [72] | Inventor | Burton Peters, Jr.<br>Erie, Pennsylvania |
|---|---|---|
| [21] | Appl. No. | 701,160 |
| [22] | Filed | Jan. 29, 1968 |
| [45] | Patented | Nov. 17, 1970 |
| [73] | Assignee | Hays Manufacturing Company<br>Erie, Pennsylvania<br>a corporation of Pennsylvania |

[54] AUTOMATIC LOCKING VALVE
9 Claims, 4 Drawing Figs.

[52] U.S. Cl. ................................................. 137/797,
251/89, 251/65
[51] Int. Cl. ................................................. F16k 35/16
[50] Field of Search .......................................... 251/113,
89, 69, 111, 65; 137/797

[56] References Cited
UNITED STATES PATENTS

| 441,190 | 11/1890 | Ott | 251/89 |
|---|---|---|---|
| 2,167,448 | 7/1939 | Feld | 251/89X |
| 2,819,432 | 1/1958 | Ray | 251/129X |
| 2,835,468 | 5/1958 | Sparks | 251/129 |
| 2,843,152 | 7/1958 | Laird et al. | 137/797 |
| 3,004,550 | 10/1961 | Poisker | 251/317X |

*Primary Examiner*—M. Cary Nelson
*Assistant Examiner*—Michael O. Sturm
*Attorney*—Charles L. Lovercheck ABSTRACT: The valve disclosed herein is similar to the ground key plug valves ordinarily used to connect gas service to a residence or the like. A spring loaded locking pin is supported in the body of the valve and this pin snaps into a depression or notch in the valve plug when the valve is rotated beyond its normal closed position.

Patented Nov. 17, 1970

3,540,481

INVENTOR.
BURTON PETERS JR.
BY
Charles L. Lovenbach
attorney

AUTOMATIC LOCKING VALVE

The plug has a check pin which normally limits the rotation of the plug to the normal stop position.

Thus, the customer can normally rotate the plug back and forth between open and closed position within the limits of the check pin.

Should the gas company wish to shut off the gas from the house, they will merely remove the check pin and rotate the plug beyond its normal closed position. Thus, the stop pin will snap into place and lock the valve against reopening. In order to open the valve it would be necessary to utilize a powerful magnet of a suitable configuration and strength. It is not likely that the ordinary unauthorized person would have such a magnet available. The locking pin is completely obscured from view within the valve body and, therefore, the unauthorized person would normally not suspect what is locking the valve against rotation.

Customers who have had their gas turned off for nonpayment of bills sometimes circumvent the conventional locking means placed on the valve by the gas company. The usual means of locking the gas valve in the off position is a lock wing or a steel clamp. Both of these means are sometimes cut by the customer with a hacksaw so that the locking means becomes ineffective.

It is, accordingly, an object of the invention to provide a valve which can be turned on and off in a conventional manner and can also be locked in a closed position by the gas company by an improved means.

It is a further object of the invention to provide an improved locking means which is completely obscured within the valve body.

Another object of the invention is to provide an improved gas valve.

Another object of the invention is to provide an improved gas valve which is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
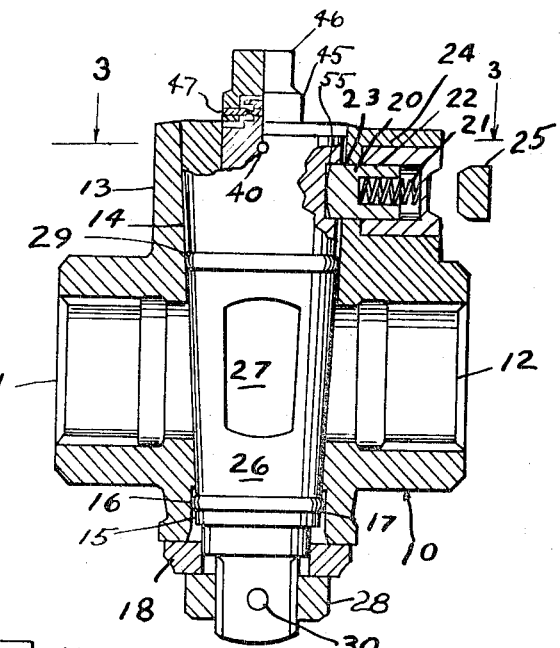
FIG. 1 is a longitudinal cross-sectional view of a valve according to the invention.
Figure 4:
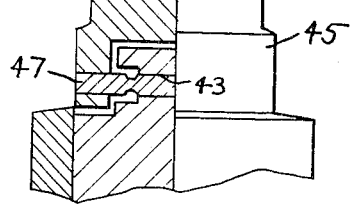
FIG. 4 is an enlarged partial view partly in cross section of the valve.
Figure 2:
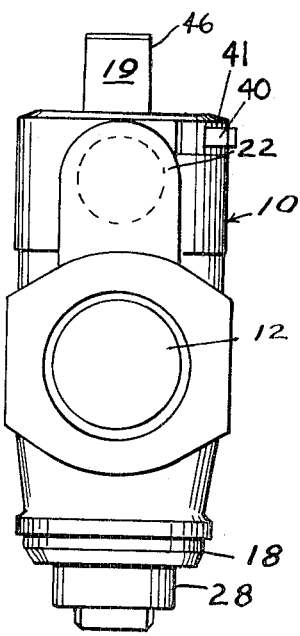
FIG. 2 is an end view of the valve shown in FIG. 1.

Now with more particular reference to the drawings, the valve shown has a body 10 with an inlet 11 and an outlet 12 of the conventional type. The boss 13 is integrally cast into the body and it has the tapered seat 14 ground in it, which receives the plug 26. The lower end of the seat is counterbored at 15, and the plug 26 has an upper circumferential groove and a lower circumferential groove, which receive the O-rings 16 and 29 respectively. A washer 18 is supported on the lower end of the plug, and it engages the body, while a nut 28 is threadably received on the lower end of the valve and the washer holds the plug in position in the valve body. A groove pin 30 is received in the lower threaded end of the valve, and it locks the nut 28 in place on the plug.

The pin 40 is threadably engaged in plug 26 and pin 40 will be against the shoulder 41 of the body when the valve is in closed position. When it is rotated 90° to the open position, so that the port 27 will be aligned with the inlet 11 and outlet 12, the pin 40 will be against the shoulder 42. If the gas company wishes to turn the valve off, the gas company serviceman will remove the pin 40, then he will rotate the plug 180° from position shown in FIG. 3 and in this position, the pin 20 will snap into the opening in the plug. In any other position, the pin 20 will rest on the outer peripheral surfaces of the plug.

The cap 45 has a wrench receiving end 46. Cap 45 is held to plug 26 by shear pin 47 which fits in holes 43 in plug 26. When pin 20 is in the opening 55 in the plug as shown in FIG. 1, and the customer engages member 46 with a wrench, shear pin 47 will fail and the cap 45 will freely rotate on plug 26 until the shear pin 47 is replaced.

The cup 22, which may be of brass or similar nonmagnetic material so that a magnet will effectively act through it, is received in a first opening in the boss in the valve body, as shown, and the lock cup 22 is received in a bore 23 formed in the plug. This bore or opening receives the inward end of the locking pin 20 when the valve is moved to the closed position shown in FIG. 1. Locking pin 20 is received in the cup.

The magnet 25 may be supported on the outside of the body or may be brought into relation manually, so that the magnet will attract the magnetic material of the locking pin 20 and pull the locking pin out of the opening in the valve plug against the force of the spring 21. Magnet 25 may have a special shape such as a bullet-shaped end as shown so that it will be even more difficult to unseat pin 20.

The plug has a passage 27, which will be perpendicular to the path between the inlet 11 and the outlet 12, when the valve is in the closed position shown in FIG. 1. The nut 28 will be supported on the lower threaded end of the plug and the O-rings 29 and 16 will be in their respective grooves on the plug as shown.

The normal off position is shown in FIG. 1. When the gas company wishes to lock the valve, the regular check pin 40 is removed by means of a suitable screwdriver or the like and the plug 26 is rotated to position 180° from the normal off position. With the check pin 40 in place, the inner end of the locking pin will always rest against the outer periphery of the plug. With the check pin 40 removed, the further rotation of the plug brings the opening in the plug into alignment with the locking pin while the plug is still in the off position.

Figure 3:
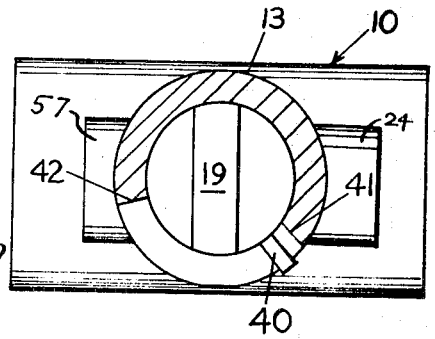
FIG. 3 is a top cross-sectional view of the valve taken on line 3—3 of FIG. 1.

A top cross-sectional view of the valve is shown in FIG. 3. The view in FIG. 3, however, shows an additional boss 57 which would contain an additional locking pin similar to locking pin 20 in boss 24 on the opposite side of the plug. This would more positively lock the plug than a single pin since there would be one locking pin at each side of the plug.

When either of the locking pins have snapped into position shown for the locking pin in FIG. 1, the customer cannot turn the valve to the on position without the aid of a magnet and since the cup member 22 is fairly flush with the outside of the valve body, the ordinary customer will not understand that a magnet is necessary.

As explained above, two or more locking pins could be spaced around the plug in suitable bosses as shown in FIG. 3 so that it would take several magnets, acting in unison, to open the locking pins so that the plug could be rotated to the open position.

I Claim:

1. A lock comprising:
    a first member and a second movable member adapted to slide relative to each other;
    a first opening in said first member;
    a second opening in said second member;
    a locking pin in said first opening;
    a spring means in said first opening;
    said openings being aligned with each other when said first member is in a first position relative to said second member;
    said openings being out of alignment with each other when said members are in a second position relative to each other;
    said spring means engaging said locking pin and urging it toward said second member and into said second opening, locking said first member against sliding on said second member when said members are in said second position;
    a boss on said first member;
    a closure member made of nonmagnetic material enclosing said locking pin and said spring and concealing them in said boss; and a permanent magnet for actuating said pin, said locking pin being made of magnetic material are adapted to be drawn from said second opening by said permanent magnet held adjacent said closure, whereby said members will slide relative to each other.

2. The lock recited in claim 1 wherein said first member and said second member are a valve body and a plug rotatably received in said valve body.

3. The valve and plug recited in claim 2 wherein:
said valve body has an inlet and an outlet;
said plug is rotatably received in said body;
said plug has a port aligned with said inlet and said outlet when said valve is in a second position, whereby said valve is turned on; and
said port being out of alignment with said inlet and said outlet when said plug is in a first position.

4. The valve and plug recited in claim 3 wherein said first opening has a nonmagnetic cup member in it opening toward said valve and receiving said locking pin and said spring.

5. The valve and plug recited in claim 4 wherein a plurality of said locking pins is provided at spaced positions around said valve.

6. The valve and plug recited in claim 3 wherein said valve and plug are made of nonmagnetic material.

7. The valve recited in claim 4 wherein a peripheral groove is provided in said plug above said port and another said peripheral groove in said plug below said port, and an O-ring in each said groove.

8. The valve recited in claim 7 wherein said plug has a nut thereon holding said plug in said body.

9. The valve recited in claim 8 wherein:
a cap is supported on said plug;
said cap is fixed on said plug against rotation by a shear pin;
a wrench receiving end on said plug; and
said shear pin being adapted to shear when a force of greater than a predetermined value is exerted on said cap.